United States Patent [19]

Shibayama

[11] Patent Number: 5,034,815
[45] Date of Patent: Jul. 23, 1991

[54] SEPARATION CIRCUIT FOR IMPOSING DETECTION TIMINGS OF A SYNCHRONOUS SIGNAL USED IN A VIDEO APPARATUS

[75] Inventor: Kenji Shibayama, Shinagawa, Japan

[73] Assignee: Victor Company of Japan, Ltd., Yokohama, Japan

[21] Appl. No.: 528,320

[22] Filed: May 25, 1990

[30] Foreign Application Priority Data

May 29, 1989 [JP] Japan ................... 1-135146

[51] Int. Cl.[5] .......................................... H04N 5/08
[52] U.S. Cl. ........................... 358/153; 358/155
[58] Field of Search ............... 358/153, 154, 155

[56] References Cited

U.S. PATENT DOCUMENTS

| | | | |
|---|---|---|---|
| 3,527,887 | 9/1970 | Clapp et al. | 358/153 |
| 3,819,859 | 6/1974 | Borsuk et al. | 358/154 |
| 3,845,240 | 10/1974 | Alaily | 358/153 |
| 4,621,288 | 11/1986 | Yamada et al. | 358/155 X |
| 4,701,796 | 10/1987 | Kamiya | 358/154 |
| 4,769,704 | 9/1988 | Hirai et al. | 358/153 X |
| 4,792,852 | 12/1988 | Narusawa | 358/153 |

Primary Examiner—Victor R. Kostak
Attorney, Agent, or Firm—Fleit, Jacobson, Cohn, Price, Holman & Stern

[57] ABSTRACT

A horizontal synchronous signal separation circuit is applied to video apparatus such as a video tape recorder, television receiver, and projector. The separation circuit includes a signal separating portion for detecting the trailing edge of a horizontal synchronous signal and obtaining a separation signal whose timing is referenced to the trailing edge, a window pulse generating portion for obtaining a window pulse whose timing is referenced to the leading edge of the synchronous signal, and a gate for subjecting the separation signal generated by the signal separating portion to a masking process by the window pulse. The gate which causes the separation signal to be subjected to a masking process, may directly output the window pulse as the separation signal if the separation signal is not present within the window. The separated synchronous signal finally obtained has a timing reference related to the trailing edge of the original horizontal signal, and the synchronous signal can be separated reliably and the synchronizing system of a video apparatus can be made stable.

6 Claims, 4 Drawing Sheets

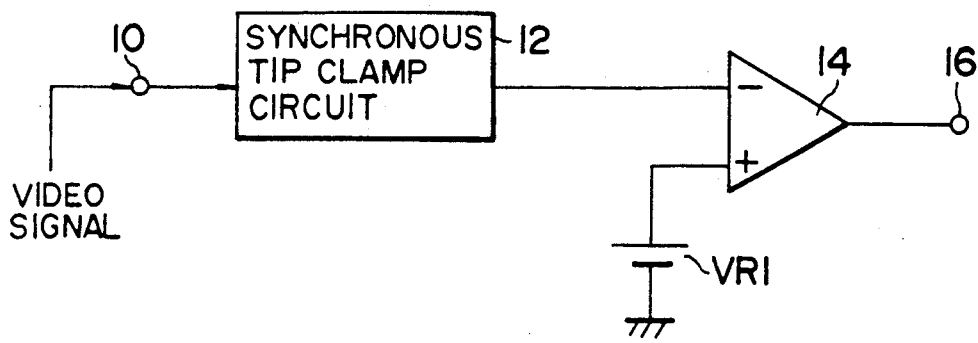
FIG.1
(PRIOR ART)
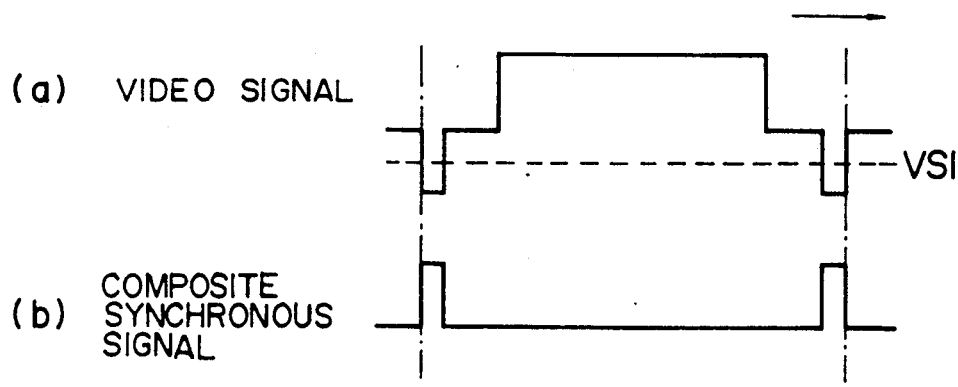
FIG.2
(PRIOR ART)
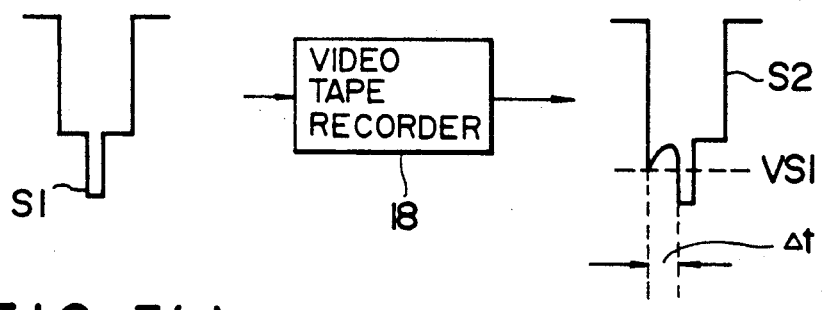
FIG.3(a)
(PRIOR ART)
FIG.3(b)
(PRIOR ART)
FIG.3(c)
(PRIOR ART)

SEPARATION CIRCUIT FOR IMPOSING DETECTION TIMINGS OF A SYNCHRONOUS SIGNAL USED IN A VIDEO APPARATUS

BACKGROUND OF THE INVENTION

The present invention relates to a horizontal synchronous signal separation circuit used with video apparatus such as video tape recorder, television receiver, projector and the like, and more particularly to an improvement on detection timings of a synchronous signal.

An example of a conventional horizontal synchronous circuit is shown in FIG. 1. In FIG. 1, a video signal input terminal 10 is connected to the input side of a synchronous tip clamp circuit 12 whose output side is connected to the negative input of a comparator 14. A reference voltage VR1 is inputted to the positive input of the comparator 14 to compare an input to the negative terminal with the reference voltage VR1. The output side of the comparator 14 is connected to an output terminal 16.

The operation of such a conventional circuit will be described with reference to FIG. 2. A video signal inputted to the terminal 10 is subjected to DC restoration at the synchronous tip clamp circuit, and thereafter compared with the reference voltage VR1 by the comparator 14 (refer to FIG. 2(a)). A composite synchronous signal shown in FIG. 2(b) is thereby outputted to the terminal 16.

Since a conventional circuit separates a horizontal synchronous signal by comparing the dc-restored video signal with the reference voltage, the obtained composite synchronous signal is in synchronism with the leading edge of the synchronous signal within the inputted video signal. In the synchronizing system of a video apparatus such as a video tape recorder, video signals are processed by using as the synchronous timing reference the leading edge of the composite synchronous signal.

There is however associated with some problem that the timing of the leading edge of a synchronous signal contained in a video signal reproduced from a video tape recorder for example is likely to be affected by the contents of the video signal, resulting in an erroneous detection of the synchronous signal.

More specifically, as shown in FIG. 3, an original video signal S1 shown in FIG. 3(a) recorded and reproduced by a video tape recorder shown in FIG. 3(b) may sometimes become a signal S2 as shown in FIG. 3(c). In such a case, a conventional circuit will separate a composite synchronous signal S3 as shown in FIG. 3(c). Therefore, the leading edge of the separated synchronous signal has a shift t from the leading edge of the synchronous signal contained in the original video signal S1. Noises are therefore generated in the synchronizing system of video apparatus, resulting in an unstable operation of the synchronizing system.

SUMMARY OF THE INVENTION

The present invention has been made in consideration of the above circumstances. It is therefore an object of the present invention to provide a horizontal synchronous signal separation circuit capable of reliably separating a synchronous signal and ensuring a stable operation of the synchronous system of video apparatus.

According to one aspect of the present invention, the horizontal synchronous signal separation circuit for separating a horizontal synchronous signal from an inputted video signal comprises signal separating means for obtaining a separation signal whose timing is referenced to the trailing edge of said synchronous signal; window pulse generating means for obtaining a window pulse whose timing is referenced to the leading edge of said synchronous signal; and gating means for subjecting said separation signal to a masking process by said window pulse.

According to another aspect of the present invention, the horizontal synchronous signal separation circuit for separating a horizontal synchronous signal from an inputted video signal comprises signal separating means for obtaining a separation signal whose timing is referenced to the trailing edge of said synchronous signal; window pulse generating means for obtaining a window pulse whose timing is referenced to the leading edge of said synchronous signal; and gating means for causing said separation signal to be subjected to a masking process by said window pulse, and if said separation signal is not present within said window, outputting said window pulse as said separation signal.

According to the present invention, a window pulse is generated whose timing is referenced to the leading edge of a synchronous signal in a video signal, whereas a separation signal is generated whose timing is referenced to the trailing edge of the synchronous signal. The window pulse is used for the execution of a masking process relative to the separation signal, to thereby obtain a final synchronous signal which is referenced to the trailing edge of the original horizontal synchronous signal. Accordingly, the synchronous signal can be separated reliably and the synchronizing system of a video apparatus can be made stable.

BRIEF DESCRIPTION OF THE DRAWINGS

In the accompanying drawings,

FIG. 1 is a block diagram showing the structure of a conventional horizontal synchronous signal separation circuit;

FIG. 2 shows waveforms at circuit portions shown in FIG. 1;

FIG. 3A-3C illustrate an erroneous detection operation by a conventional circuit;

DETAILED DESCRIPTION OF THE PREFERRED EMBODIMENTS

Figure 5:
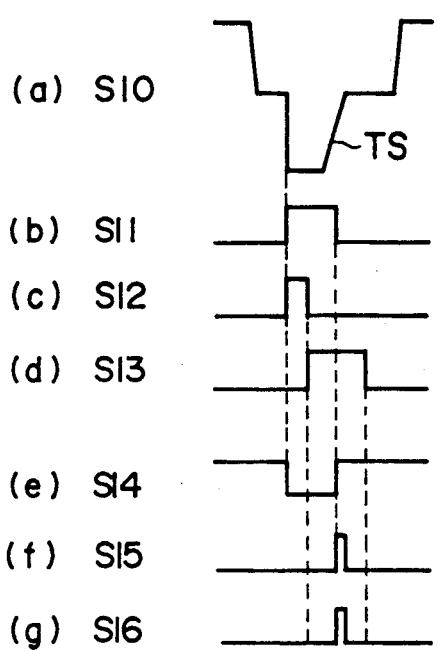
FIGS. 5 and 6 are timing charts illustrating the operation of the first embodiment circuit.

Preferred embodiments of the present invention will be described with reference to the accompanying drawings, wherein like elements to those conventional ones are represented by identical reference numerals.

1st Embodiment

Figure 4:
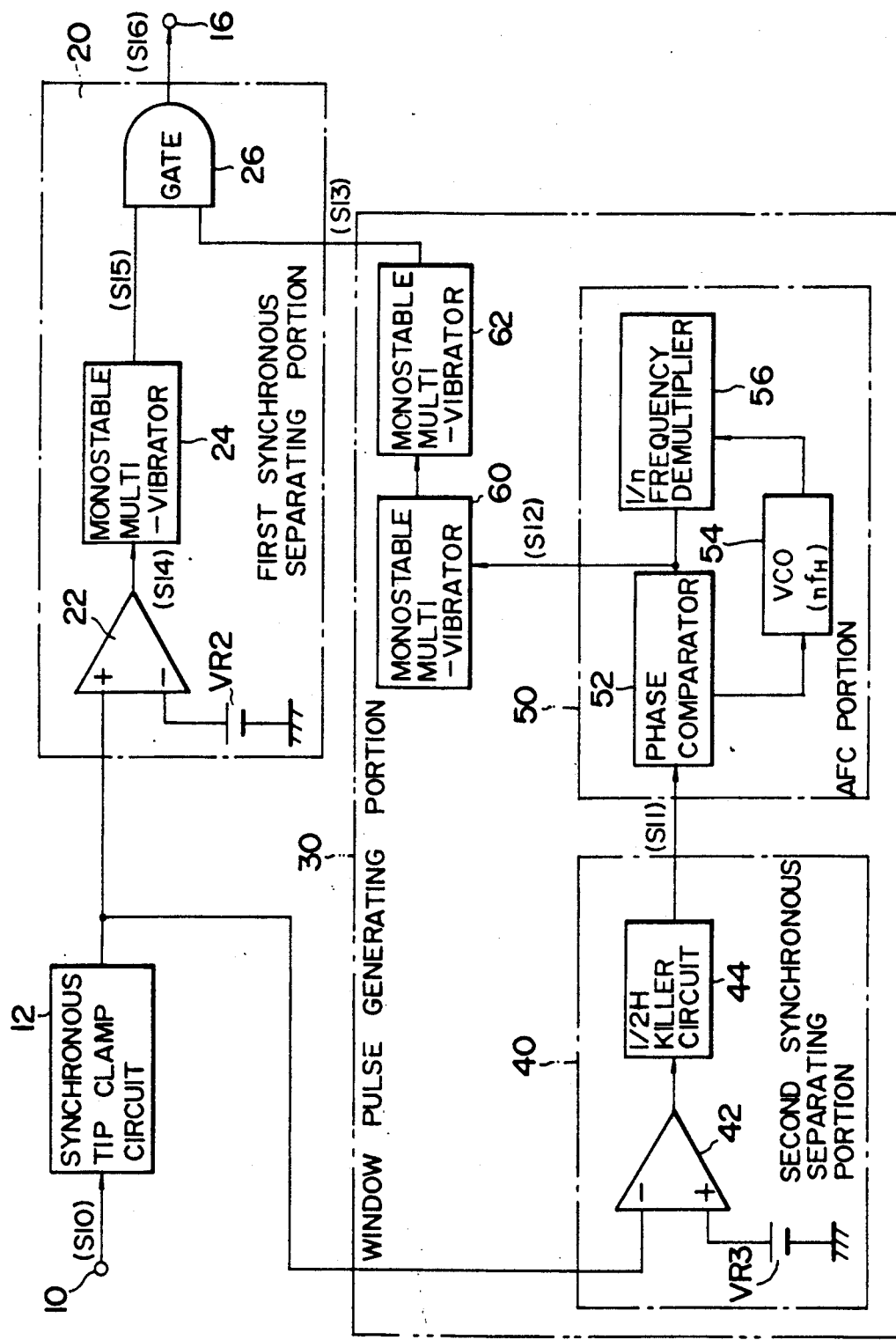
FIG. 4 is a block diagram showing the structure of the horizontal synchronous signal separation circuit according to a first embodiment of this invention.

FIG. 4 shows the structure of the horizontal synchronous signal separation circuit according to the first embodiment of this invention. Referring to FIG. 4, the output side of a synchronous tip clamp circuit 12 is connected to the input side of a first synchronous separating portion 20 and to the input side of a window pulse generating portion 30. The output side of this window pulse generating portion is connected to the first synchronous separating portion 20 to control the output of the first synchronous separating portion 20 by a window pulse from the window pulse generating portion 30.

The first synchronous separating portion 20 will first be detailed. The output side of the synchronous tip clamp circuit 12 is connected to the positive input of a comparator 22. The negative input thereof is connected to a comparison reference voltage VR2. The output side of the comparator 22 is connected to a monostable multi-vibrator 24 whose output side is connected to one input of an AND gate 26. The output side of the AND gate 26 is connected to an output terminal 16.

The window pulse generating portion 30 is constructed of a second synchronous separating portion 40, automatic frequency control portion (hereinafter called AFC portion), and monostable multi-vibrators 60 and 62. In the second synchronous separating portion 40, the output side of the synchronous tip clamp circuit 12 is connected to the negative input of a comparator 42 whose positive input is applied with a comparison reference voltage VR3. The output side of the comparator 42 is connected to the input side of a ½ H killer circuit 44 which outputs a signal processed by the second synchronous separating portion 40.

In the AFC portion 50, the output side of the second synchronous separating portion 40 is connected to the input side of a phase comparator 52 whose output side is connected to a voltage controlled oscillator (hereinafter called VCO) 54 for generating a signal having a frequency of n-fold synchronous signal. The output side of VCO 54 is connected to a 1/n frequency demultiplier 56 whose output side is connected to the input side of the phase comparator 52. The phase comparator 52, VCO 54, and 1/n frequency demultiplier 56 constitute an AFC closed loop. The 1/n frequency demultiplier 56 generates a signal processed by the AFC portion 50 and outputs it to the monostable multi-vibrator 60.

The output side of the monostable multi-vibrator 60 is connected to the input side of the monostable multi-vibrator 62 whose output side is connected to the other input of the AND gate 26. The monostable multi-vibrators 60 and 62 generates a window pulse to be described later.

The operation of the first embodiment will be described with reference to FIGS. 5 and 6. Referring to first to FIG. 5 which illustrates the case where an input video signal is stable. The synchronous signal component in an input video signal S10 at the terminal 10 is as shown in FIG. 5(a). Upon input of this signal to the second synchronous separating portion 40 of the window pulse generating portion 30, it is compared with the reference voltage VR3 by the comparator 42 whose output signal is subjected to an equalizing pulse processing at the ½ H killer circuit 44. As a result, a signal S11 shown in FIG. 5(b) is inputted to the AFC portion 50. The signal S11 takes a logical value "H" at the leading edge of the synchronous signal TS (refer to FIG. 5(a)).

The signal supplied to the AFC portion 50 undergoes an AFC so that a window pulse to be generated eventually is suppressed to change with time. The AFC-ed signal S12 (refer to FIG. 5(c)) is supplied to the monostable multi-vibrator 60.

The monostable multi-vibrators 60 and 62 generate a window pulse S13 which takes a logical value "H" at the trailing edge of the signal S12. The width of this window pulse S13 (FIG. 5(d)) is set so as to sufficiently cover the trailing edge of the synchronous signal TS (refer to FIG. 5(a)), and inputted to the AND gate 26.

In the meantime, in the first synchronous separating portion 20, the synchronous signal TS is compared with the reference voltage VR2 by the comparator 22 so that a signal S14 (refer to FIG. 5(e)) is supplied to the monostable multi-vibrator 24. The monostable multi-vibrator 24 is triggered at the trailing edge of the signal S14, i.e., at the trailing edge of the synchronous signal TS. The width of a pulse S15 generated by the monostable multi-vibrator 24 (refer to FIG. 5(f)) is set so that it is within the time duration of the window pulse S13. This pulse S15 is inputted to the AND gate 26.

The AND gate 26 is opened only when the window pulse S13 is inputted. In this case, therefore, the pulse S15 passes the AND gate 26 and outputted to the terminal 16 as the composite synchronous signal S16 (refer to FIG. 5(g)).

As described above, the pulse S15 takes a logical value "H" at the trailing edge of the synchronous signal TS, and so the pulse S16.

Next, the operation of the embodiment will be described further while referring to FIG. 6 which illustrates the case where there is a large skew. In the following description, it is assumed that a video signal is shifted as shown by an arrow F (refer to FIG. 6(a)) As shown in FIG. 6(b), the signal S11 outputted from the second synchronous separating portion 40 in the window pulse generating portion 30 becomes as shown not by a broken line but by a solid line because of a large skew. The signal S11 is accordingly shifted by the amount corresponding to the skew.

However, since the AFC cannot follow such a skew, the signal S12 is outputted from the AFC portion 50 at the timing used before an occurrence of the skew as shown in FIG. 6(c). Accordingly, the window pulse S13 from the monostable multi-vibrators 60 and 62 is also outputted at the corresponding timing (refer to FIG. 6(d)). On the other hand, the signal S14 is outputted from the comparator 22 in the first synchronous separating portion 20 at the timing when the skew is present (refer to FIG. 6(e)). Accordingly, the signal S15 is outputted from the monostable multi-vibrator 24 at the corresponding timing (refer to FIG. 6(f)).

The input timings of the window pulse S13 and pulse S15 to the AND gate 26 are shifted therefore to much extent, preventing the generation of an erroneous synchronous signal (refer to FIG. 6(g)).

Figure 6:
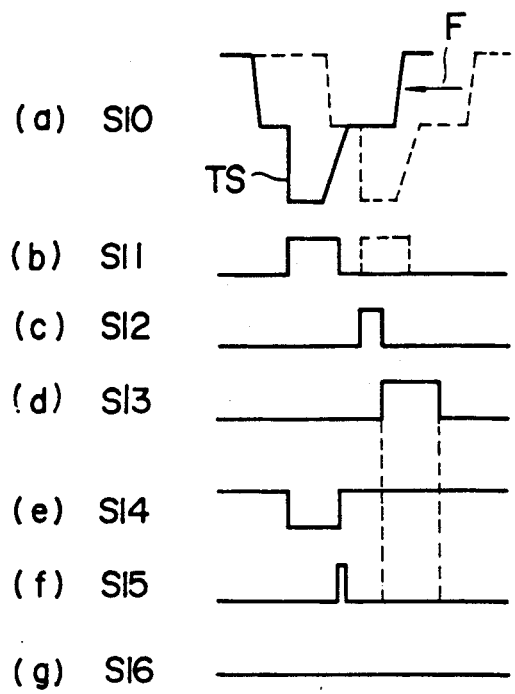

As described above, according to the first embodiment, the first synchronous separating portion 20 generates a signal at the trailing edge of an original synchronous signal in a video signal. This signal is subjected to a masking process by the window pulse at the AND gate. Such masking process reduces the detection of an erroneous synchronous signal including:

(1) synchronous signal detected from an equalizing pulse at ½ H timing in a vertical blanking period of a video signal S10,
(2) a synchronous signal detected from a noise signal such as drop-out, under-shoot and the like,
(3) a synchronous signal detected when there is a skew which the AFC portion 50 cannot follow (as shown in FIG. 6).

Further, since the AFC suppresses the fluctuation of a window pulse with time, the timing of the window pulse changes less even if the second synchronous separating portion 40 erroneously detects a noise signal such as drop-out or under-shoot. Therefore, there is no adverse influence upon the timing of the synchronous signal finally separated by the embodiment circuit.

2nd Embodiment

Figure 7:
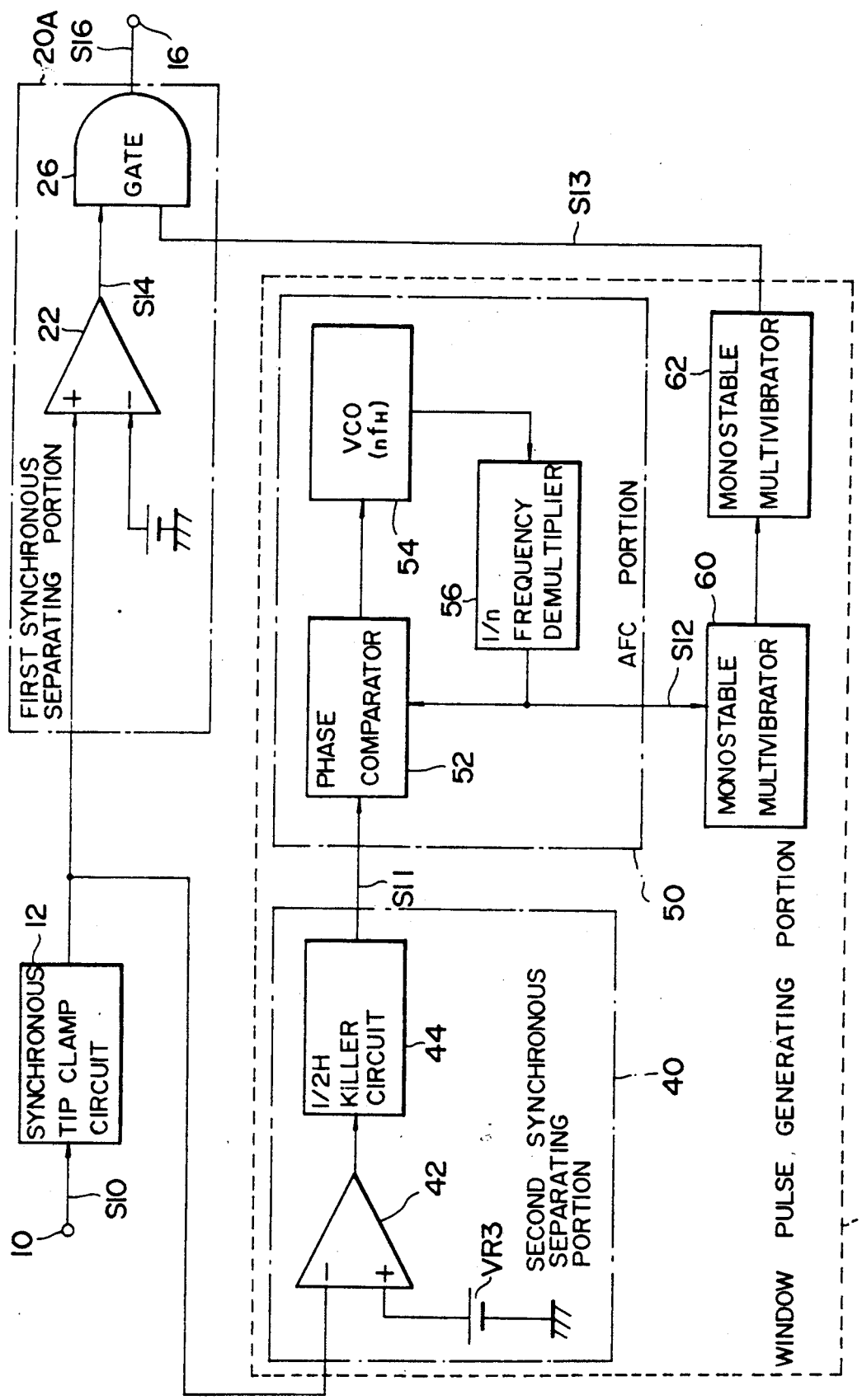
FIG. 7 is a block diagram showing the structure of the horizontal synchronous signal separation circuit according to a second embodiment of this invention.

The second embodiment of this invention will be described next. As shown in FIG. 7, the second embodiment omits the monostable multi-vibrator 24 in the first synchronous separating portion 20 of the first embodiment. Specifically, a first synchronous separating portion 20A of the second embodiment is constructed of a comparator 22 and an AND gate 26.

The operation of the second embodiment will be described next.

Figure 8:
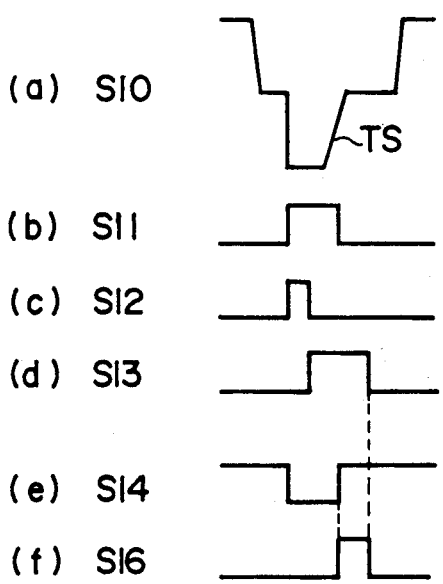
FIGS. 8 and 9 are timing charts illustrating the operation of the second embodiment circuit.

Referring to FIG. 8, the description is first directed to the case where the synchronous signal in an input video signal is stable. In this case, an output signal S14 (refer to FIG. 8(e)) from the comparator 22 and a window pulse S13 (refer to FIG. 8(d)) are inputted to the AND gate 26. An output S16 from the AND gate 26 becomes as shown in FIG. 8(f). Therefore, there is obtained a composite synchronous signal or separated synchronous signal which has a timing referenced to the trailing edge of the original synchronous signal TS.

Figure 9:
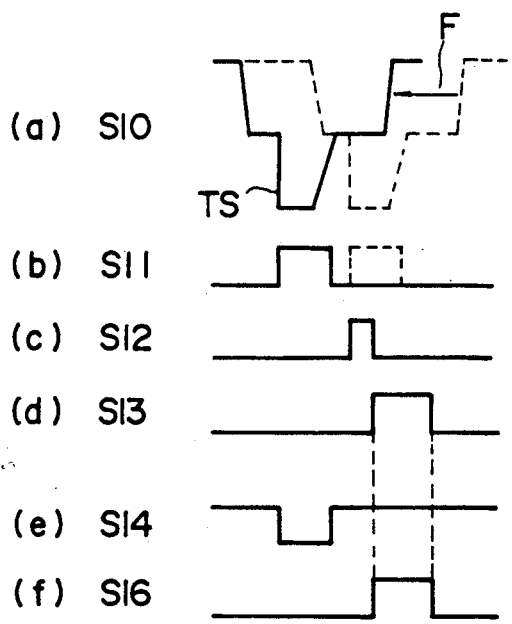

Referring next to FIG. 9, in the case where there is a large skew which the AFC portion 50 cannot follow, the timings of the signal S14 and window pulse S13 are not coincident at the AND gate 26 because of the skew (refer to FIGS. 9(d) and 9(e)). The window pulse S13 itself is directly outputted (refer to FIG. 9(f)).

Also in the second embodiment, a separated synchronous signal can be obtained whose timing is referenced to the trailing edge of the original synchronous signal in an inputted video signal. During the presence of a large skew, the window pulse itself is outputted as described above. In this case, since a fluctuation of the window pulse with time is less because of the AFC, generally stable separated synchronous signals can be sequentially generated as a whole.

The present invention is not limited to the above embodiments only. For example, instead of using the monostable multi-vibrators 60 and 62 for the determination of the leading and trailing edges thereof, such a window pulse may be generated by using an output from the VCO 54 in the AFC portion 50 and an output S12 from the AFC portion and counting them in a suitable manner.

I claim:

1. A horizontal synchronous signal separation circuit for separating a horizontal synchronous signal from a video signal, comprising:
   first separating means comprising a comparator for comparing an input video signal with a reference voltage and for obtaining a first separation signal whose timing is referenced to the trailing edge of said synchronous signal;
   window pulse generating means for obtaining a window pulse whose timing is referenced to the leading edge of said synchronous signal, said window pulse generating means comprising:
   second separating means which compares said video signal with a second separation signal as a second reference voltage, and executes equalizing pulse killing process; and
   an automatic frequency control (AFC) means which automatically frequency-controls a signal processed by said second separating signal means, and outputs a pulse signal with suppressed fluctuation with time;
   gating means for subjecting said first separation signal to a masking process in accordance with said window pulse.

2. A horizontal synchronous signal separation circuit according to claim 1, wherein said gating means causes said first separation signal to be subjected to a masking process by said window pulse, and if said first separation signal is not present within said window, outputs said window pulse as said first separation signal.

3. A horizontal synchronous signal separation circuit according to claim 1, wherein said first separating means further includes a monostable multi-vibrator which is triggered by a pulse signal outputted from said comparator at the trailing edge thereof to generate a pulse signal which is within the time duration of said window pulse.
   a second signal separating means which compares said video signal with a second reference voltage, and executes an equalizing pulse killing process; and
   an automatic frequency control (AFC) means which automatically frequency-controls a signal processed by said second signal separating portion, and outputs a pulse signal with a suppressed fluctuation with time.

4. A horizontal synchronous signal separation circuit according to claim 1, wherein said second signal separating means comprises a second comparator for receiving as a negative input said video signal and as a positive input said second reference voltage and comparing said video signal with said second reference voltage to generate a comparison output signal, and a ½ H killer circuit for subjecting said comparison output signal to an equalizing pulse killing process and outputting a signal which takes a logical value "H" at the leading edge of said synchronous signal.

5. A horizontal synchronous signal separation circuit according to claim 1, wherein said AFC means comprises a phase comparator for comparing the phase of an output signal from said second synchronous separating means with the phase of a feedback output from said AFC means, a voltage controlled oscillator (VCO) for generating a signal having a frequency of n-fold frequency of an output of said phase comparator, and a 1/n frequency demultiplier for 1/n demultiplying an output from said VCO to feedback the demultiplied signal to said phase comparator and output the demultiplied signal to said gating means, and wherein said phase comparator, VCO and 1/n frequency demultiplier constitute a closed loop.

6. A horizontal synchronous signal separation circuit according to claim 1, wherein said window pulse generating means includes two cascade-connected monostable multi-vibrators for outputting said window pulse in accordance with an output from said AFC means.

* * * * *